United States Patent [19]

Iba et al.

[11] Patent Number: 5,000,427
[45] Date of Patent: Mar. 19, 1991

[54] INJECTION MATERIAL FOR USE IN BLAST FURNACE

[75] Inventors: Takeshi Iba, Osaka; Junji Kariya, Ibaraki; Yoshichika Yanagibashi, Ibaraki; Masaaki Koba, Ibaraki; Akira Watanabe, Okayama; Takeo Okamura, Bizen; Yasutoshi Mizuta, Okayama; Satomi Kawahara, Okayama, all of Japan

[73] Assignees: Sumitomo Metal Industries, Ltd., Osaka; Kyushu Refractories Co., Ltd., Okayama, both of Japan

[21] Appl. No.: 924,675

[22] Filed: Oct. 24, 1986

[30] Foreign Application Priority Data

Oct. 25, 1985 [JP] Japan ............................ 60-240069
Oct. 29, 1985 [JP] Japan ............................ 60-242264

[51] Int. Cl.$^5$ ............................................. C04B 35/02
[52] U.S. Cl. ...................................... 266/273; 501/123
[58] Field of Search ................... 266/280, 281, 45, 273; 501/109, 127, 118, 119, 123; 264/30

[56] References Cited

U.S. PATENT DOCUMENTS

| | | | |
|---|---|---|---|
| 4,072,531 | 2/1978 | Funabiki et al. | 501/109 |
| 4,385,749 | 5/1983 | van der Linden | 266/45 |
| 4,440,865 | 4/1984 | Salazar | 501/127 |
| 4,469,309 | 9/1984 | Takashima et al. | 266/280 |

Primary Examiner—S. Kastler
Attorney, Agent, or Firm—Wenderoth, Lind & Ponack

[57] ABSTRACT

The present invention relates to an injection material for the hot repairing of a blast furnace and an injection method of applying the same. An injection material comprising a refractory material, which was previously adjusted in particle size, a binder, a hardening agent and a hardening-accelerator is fed to a pressure pump having a mixing function and applied to a portion to be repaired of a blast furnace with mixing in said pump. Thus, since the hardening ingredient is not added until the pump portion, the workability of the repair material can be secured in of a blast furnace to be repaired, said injection material being mixed in said pump. Thus, the injection repairing of the blast furnace can be achieved without being influenced by an atmosphere within the furnace.

6 Claims, 1 Drawing Sheet

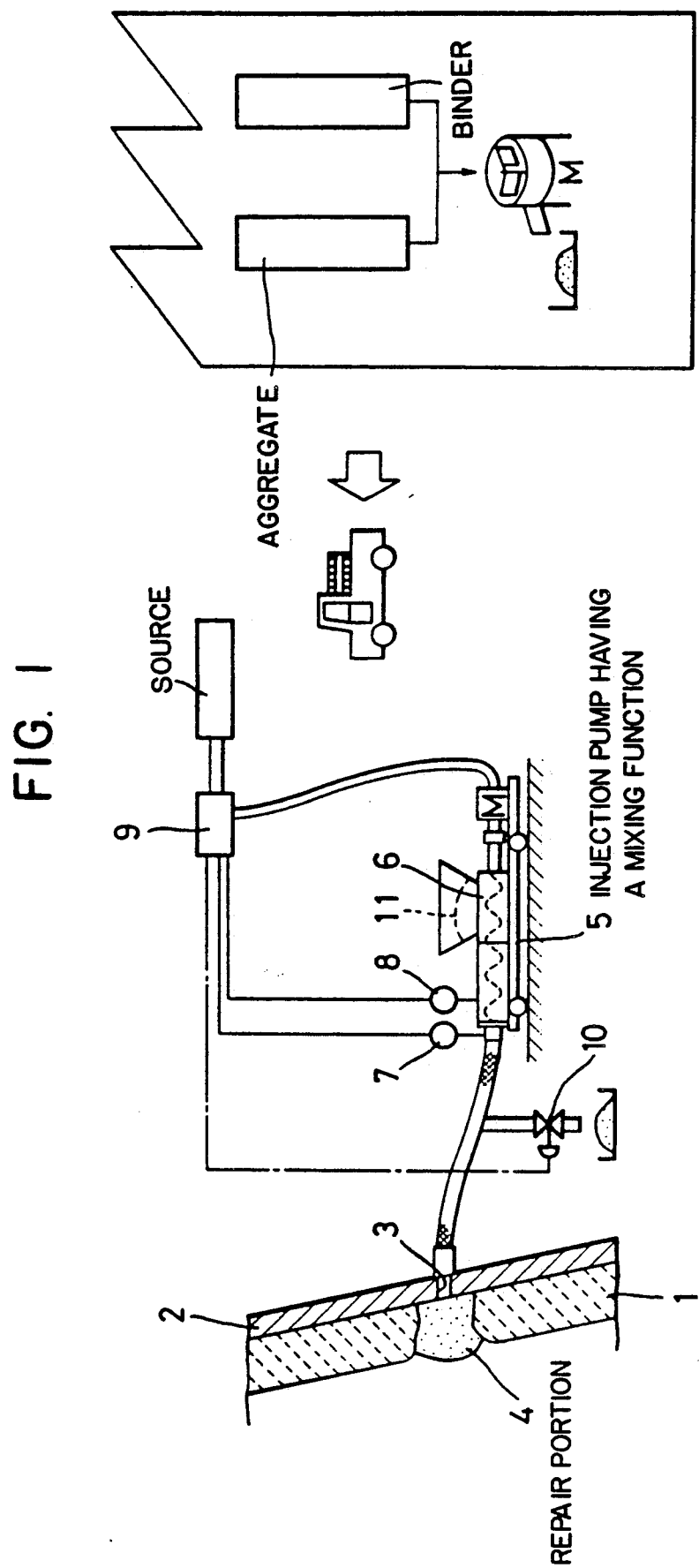

INJECTION MATERIAL FOR USE IN BLAST FURNACE

DETAILED DESCRIPTION OF THE INVENTION

BACKGROUND OF THE INVENTION

The present invention relates to an injection material for use in the hot repairing of a furnace wall of a blast furnace and a method of applying the same under pressure, in particular to an injection material superior in low-temperature hardenability and durability for use in a relatively low temperature portion, such as a space between water cooled panels or between stave-coolers of the blast furnace, and an injection method of applying the same.

The repairing of a blast furnace is remarkably important in respect to not only the prolongation of the life but also the stable operation of the blast furnace and the injection repairing of the blast furnace has been carried out during the suspension of the blast operation, a repairing material containing binder, such as sodium silicate, has been used as an injection material. However, this sodium silicate injection material is not a durable binder due to the poor adhesion of sodium silicate to carbon-bonded bricks and is especially ineffective under severe operating conditions of the blast to furnace carbonaceous injection materials using tar, pitch or various kinds of resin as a binder have been increasingly used.

The temperature of the space between water cooled panels or between stave-coolers, is further reduced during the suspension of blast operation, so that an injection material using tar or pitch as a binder has never exhibited a sufficient adhesion to the furnace wall and a sufficient hardening in a short time until the restart of the operation. As a result, it has never exhibited a satisfactory durability.

Thus, a low temperature hardening material using thermoplastic phenolic resins as a binder, and hexamethylenetetramine as a hardening agent, or a material using thermosetting phenolic resins or furan resins together with p-toluenesulfonic acid have been proposed.

However, the material using thermoplastic phenolic resins together with hexamethylenetetramine as a hardening agent has a disadvantage in that the hardening proceeds at temperature in the range of the decomposition temperature of the hexamethylenetetramine or higher, for example, at temperatures of 150° C. or higher, however sufficient hardening does not proceed at such temperatures.

On the other hand, with a material using thermosetting phenolic resins or furan resins together with p-toluenesulfonic acid, not only does the hardening proceed even at room temperature, but also the hardening speed can be adjusted by changing the quantity of organic acid added. However, this material also has never exhibited a sufficient durability in the use thereof in a practical furnace. A reason for this seems to be that once the reaction starts, it proceeds with increasing speed since the hardening by the use of organic acids is an exothermic reaction, whereby the resulting repaired body is high in porosity and inferior in physical properties. Moreover since the atmosphere within the blast furnace is highly alkaline, an acid used as the hardening agent reacts with the alkaline atmosphere, whereby the repaired body is made deteriorated.

On the other hand, as to the repairing, in the case where the repairing material is hardened at high temperatures, all materials including the hardening agent can be mixed in the factory and the mixed material is simply injected by means of an injection apparatus in the working area. However, in the case where the injection repairing is carried out by the use of materials hardening at low temperatures, the reaction by the hardening agent starts at the time when all ingredients and a wetting agent are mixed to form a slurry, so that it is impossible to mix the materials 2 to 10 days before repairing a furnace.

Although the above problem can be overcome by simply adding the hardening agent and mixing the ingredients in the working area, in the case where the hardening agent is added and mixed, a large amount, for example, 1 to 2 tons, of injection material must be mixed at a time in a large-sized mixer in order to efficiently mix with the binder and the hardening agent. However, it is more preferable to inject a small amount, such as 100 to 300 kg, of the injection material in the furnace through a large number of openings than to inject a large amount of the injection material through only one opening in view of the repairing of a wide range within the furnace. Accordingly, it takes 2 to 3 hours from the completion of the mixing till the completion of the working, so that if the mixing is carried out at a time, the materials are hardened in the hose used to transport the materials, thereby making the transportation of the repairing material impossible.

In addition, the temperature of a blast furnace side wall is not constant throughout due to the variety of the thickness of the remaining bricks, varying operating conditions and the like. It is desirable that the injection material has an appropriate hardening speed but it is impossible in the case wherein the materials harden quickly as discussed above.

Even if the amount of the injection material necessary for injection to one opening is mixed, it takes about one hour to charge the materials in a hopper and inject the resulting repairing material in the portion to be repaired, so that a large amount of injections can not be performed during the suspension of the blast operation.

In this time, although the hardening time can be increased by reducing the quantity of the hardening agent, a small amount of the hardening agent can not achieve the desired object for repair in the case where a temperature of the portion to be injected is low.

In view of the above, a method, in which a hardening agent is poured into refractory materials by means of a nozzle, has also been proposed (Japanese Patent Publication No. 56-1363). However, with this method, since the mixing is insufficient, the stable repair can not be achieved. In addition, considerable hands are required for the parallel operation of injection pumps and the like, so that this method is practically unsuitable.

MEASURES FOR SOLVING THE PROBLEMS

The present inventors have achieved the present invention as a result of investigating the use of an injection material for repairing a blast furnace capable of hardening even at relatively low temperatures, adjusting the hardening speed thereof and which injection material is not influenced by the atmosphere within the blase furnace as well a method of repairing the furnace. That is to say, the present invention is characterized in that a hardening-accelerator is added to a mixture comprising a refractory material, previously adjusted in particle size, a binder and a hardening agent directly before the repairing material is injected or the hardening agent and the hardening-accelerator are added to a mixture comprising a refractory material and a binder directly before the repairing material is injected, and the resulting injection repair material is fed to an injection pump having a mixing function to be injected with mixing by means of said injection pump.

EFFECTS

The injection material for use in a blast furnace according to the present invention is hardened by the reaction of a thermosetting resin contained therein upon a hardening agent with the assistance of a hardening-accelerator. Since the speed of the hardening reaction can be regulated by adjusting the combination of epoxy radical-contained organic compounds as the hardening agent and alkaline compounds as the hardening-accelerator and their quantity to be added, a time from the moment when the repairing material is injected till the moment when it is hardened can be controlled at any temperature.

Besides, since the hardening reaction of this injection material for use in a blast furnace according to the present invention speedily proceeds without any exothermic effect, a repaired body having a lower porosity and superior physical properties can be obtained. Furthermore, since an acidic ingredient, which reacts upon an alkaline atmosphere within a blast furnace, is not contained in this repairing material according to the present invention, the durability can be still more improved.

Still further, according to the method of injecting the repairing material of the present invention, the hardening does not start until about 5 to 10 minutes after the addition of the hardening agent or the hardening accelerator, so that the injection of the repairing material can be completed within this time and prior to the hardening.

CONSTRUCTION OF THE INVENTION

The injection material for use in a blast furnace according to the present invention comprises a refractory material, which was previously adjusted in particle size, a thermosetting resin as a binder, an epoxy radical-contained organic compound as a hardening agent and an alkaline compound as a hardening-accelerator.

The refractory material includes alumina, chamotte, bauxite, clay and the like. Carboneous materials, such as graphite and petroleum coke, can be added if necessary. Also coal-tar pitch or petroleum pitch may be added. Its particle-size distribution is preferably over 1 mm 15 to 35%, 1 to 0.125 mm 20 to 40% and under 0.125 mm 35 to 60%.

The thermosetting resin used in the present invention includes phenolic resins, furan resins or modified resins thereof. If it is liquid at the room temperature, it can be used as it is, while if it is solid at the room temperature, it is necessary to dissolve it in an appropriate organic solvent. Its properties and conditions are not limited at all. The thermosetting resin is added at a ratio of 5 to 70 parts by weight, preferably 7 to 50 parts by weight, based on 100 parts by weight of the refractory material. The addition of the thermosetting resin at a ratio of less than 5 parts by weight is not preferable since the strength of the repaired body is reduced and the adhesion of the repairing material to the furnace wall is reduced. On the other hand, the addition of the thermosetting resin at a ratio of more than 70 parts by weight leads to an increase in the porosity at high temperature, whereby the physical properties deteriorate.

The epoxy radical-containing compound as the hardening agent includes aliphatic epoxy compounds and alicyclic epoxy compounds in addition to propylene oxide, and pichlorohydrin. The epoxy radical-containing compound, which is a low viscous liquid at the room temperature, such as epichlorhydrine, is most suitable since it serves also as a solvent for the thermosetting resin. The hardening agent is added at a ratio of 5 to 70 parts by weight, preferably 8 to 50 parts by weight, based on 100 parts by weight of the thermosetting resin. The addition of the hardening agent at a ratio less than 5 parts by weight leads to a difficulty in regulating the hardening speed, while the addition of the hardening agent at a ratio of more than 70 parts by weight leads to the loss of s superior heat-resistance incidental to thermosetting resins.

The alkaline compound as the hardening-accelerator includes sodium carbonate, water glass, magnesium oxide, calcium oxide, ammonia and the like which are used as they are or in dispersed in an organic solvent. The hardening-accelerator is added at a ratio of 6 to 50 parts by weight based on 100 parts by weight of the thermosetting resin. The addition of the alkaline compound at a ratio of less than 6 parts by weight or more than 50 parts by weight is not preferably since the former leads to an insufficient hardening of the injection material at low temperatures while the latter leads to a reduced durability of the injection material at high temperatures.

The method of injecting repairing material according to the present invention is described with reference to FIG. 1 which is a flow chart showing a process.

Referring to FIG. 1, reference numeral 1 designates a brick of a blast furnace, 2 designates a steel shell, and 3 designates an opening provided in a portion 4 of brick 1 to be repaired. 5 designates an injection pump having a mixing function to inject a repairing material to the furnace through said opening 3, for example, a screw type injection pump, provided with a stirrer 6 having also a mechanism for transporting the injection material, a pressure-gauge 7 for measuring a pressure within said injection pump 5 and a thermometer 8 for detecting the temperature within said pump 5. Reference numeral 9 designates a control panel for carrying out the operation of a safety valve 10 and stoppage of the injection pump 5 on the basis of measured values by said pressure-gauge 7 and thermometer 8 in case of emergency.

In the practice of the present invention, at first, a hardening-accelerator and a mixture comprising a refractory material, a binder and a hardening agent are separately prepared.

Upon charging an appointed amount of said mixture comprising the refractory material, the binder and the hardening agent in a hopper 11 and adding the required amount of the hardening-accelerator to the mixture, the components are stirred and mixed by means of the stirrer 6 and the injection pump 5 without delay and then injected through the opening 3 provided in the portion 4 to be repaired of the brick 1.

As above described, according to a repairing method of the present invention, since the hardening-accelerator is added immediately before injection and the repairing material is injected with mixing by means of the screw type injection pump 5, not only is the injection of the repairing material finished before it is hardened but also the amount of the hardening-accelerator to be added can be controlled so as to give a hardening speed matching the temperature of a furnace, so that the portion to be repaired can be repaired so as to give a uniform durability throughout the blast furnace by controlling the amount of the hardening-accelerator to be added, even though the portions to be repaired have different temperatures.

Although a method, in which a hardening-accelerator is added to a previously prepared mixture comprising a refractory material, a binder and a hardening agent when the repairing material is injected is described above, the hardening agent and hardening-accelerator can be added to a previously prepared mixture comprising the refractory material and the binder immediately before the repairing material is injected. Also in this case, the same procedure can be adopted for injecting the repairing material.

EXAMPLES

The present invention will be below described in detail with reference to the Examples.

EXAMPLES 1 to 4

Phenolic resins, epoxy group-contained compounds and alkaline compounds were added to a refractory material comprising alumina, silicon carbide and middle pitch at compositions as shown in Table 1 at ratios as shown in Table 1 and the resulting mixtures were tested on a hardening time at various temperatures in a range of 50 to 150° C.

Also Comparative Examples 1, 2 obtained by adding p-toluenesulfonic acid as a hardening agent to the same refractory material as in Examples 1 to 4 were tested on the hardening time.

The results ware shown in Table 1.

TABLE 1

|  | Example 1 | Example 2 | Example 3 | Example 4 | Comparative Example 1 | Comparative Example 2 |
|---|---|---|---|---|---|---|
| Refractory material (parts by weight) | | | | | | |
| Alumina 2 to 1 mm | 20 | 20 | 20 | 20 | 20 | 20 |
| 1 to 0.125 mm | 35 | 35 | 35 | 35 | 35 | 35 |
| <0.125 mm | 30 | 30 | 30 | 30 | 30 | 30 |
| Silicon carbide fines | 10 | 10 | 10 | 10 | 10 | 10 |
| Middle pitch fines | 5 | 5 | 5 | 5 | 5 | 5 |
| Thermosetting resin (parts by weight) | | | | | | |
| Liquid phenolic resin | 18 | | 17 | 18 | 18 | 18 |
| Powdery phenolic resin | | 8 | | | | |
| Hardening agent (parts by weight) | | | | | | |
| Epichlorhydrine | 4 | | | 4 | | |
| Propylene oxide | | 4 | 4 | | | |
| Ethylene glycol | | 3 | | | | |
| p-Toluenesulfonic acid | | | | | 2 | 4 |
| Hardening-accelerator | | | | | | |
| CaO | 2 | | 4 | | | |
| MgO | | 3 | | 4 | | |
| Hardening time (min) | | | | | | |
| at 50° C. | 75 | 100 | 80 | 30 | 80 | 30 |
| at 70° C. | 55 | 80 | 60 | 20 | 20 | <3 |
| at 100° C. | 40 | 50 | 30 | 10 | <3 | <1 |
| at 150° C. | 20 | 35 | 17 | 7 | <1 | <1 |
| Repaired body Hardened at 50° C. | | | | | | |
| Apparent porosity (%) | 8.8 | 7.5 | 9.1 | 8.1 | 10.4 | 14.2 |
| Bulk density | 2.03 | 1.99 | 2.06 | 2.01 | 1.89 | 1.77 |
| Hardened at 100° C. | | | | | | |
| Apparent porosity (%) | 13.3 | 12.1 | 11.4 | 12.9 | 49.2 | 52.4 |
| Bulk density | 2.05 | 2.02 | 2.04 | 2.05 | 1.21 | 1.17 |

EXAMPLE 5

In No. 1 blast furnace of A Steel Works, 100 kg of a repairing material have been injected in about 30 opened portions of steel shell having a diameter of 30 mm provided in high temperature portions of steel shell, in total 3 tons, on one day/month of the suspension of blast operation to protect the steel shell.

In that time, a repairing material having a composition as shown in Table 2 was injected in 10 portions of each place by means of a screw type injection pump and the remaining of the repair material was observed. The results are shown in Table 2.

In Example 5, an amount of MgO as the hardening-accelerator was varied from 2 parts by weight for the lowest temperature portion to 5 parts by weight for the highest temperature portion on the basis of measured temperature of each portion. In Comparative Example 3,4, the hardening agent was added in the same amount.

TABLE 2

|  | Example 5 | Comparative Example 3 | Comparative Example 4 |
|---|---|---|---|
| Composition (parts by weight) | | | |
| Refractory material | 20 | 20 | 20 |
| Alumina 2 to 1 mm | 30 | 30 | 30 |
| 1 to 0.125 mm | 45 | 45 | 45 |
| <0.125 mm | 5 | 5 | 5 |

TABLE 2-continued

| | Example | Comparative Example | |
|---|---|---|---|
| | 5 | 3 | 4 |
| Binder (phenolic resin) | | | |
| Liquid resol | 17 | | 17 |
| Liquid novolac | | 20 | |
| Hardening agent | | | |
| Hexamethylenetetramine | | 3 | |
| p-Toluenesulfonic acid | | | 2 |
| Epichlorhydrine | 4 | | |
| Hardening-accelerator | | | |
| Magnesium oxide | 2~5 | | |
| Test Results | | | |
| Middle portion of Shaft | 10 | 10 | 10 |
| Remaining portion | | | |
| After 1 week | 9 | 3 | 6 |
| After 2 weeks | 8 | 2 | 2 |
| After 3 weeks | 8 | 0 | 1 |
| After 4 weeks | 8 | 0 | 1 |
| Lower portion of Shaft | 10 | 10 | 10 |
| Remaining portion | | | |
| After 1 week | 9 | 4 | 8 |
| After 2 weeks | 9 | 2 | 7 |
| After 3 weeks | 7 | 2 | 5 |
| After 4 weeks | 7 | 0 | 5 |
| Bosh portion | 10 | 10 | 10 |
| Remaining portion | | | |
| After 1 week | 8 | 8 | 9 |
| After 2 weeks | 8 | 6 | 2 |
| After 3 weeks | 8 | 6 | 0 |
| After 4 weeks | 8 | 5 | 0 |

EFFECTS OF THE INVENTION

As found in Table 1, the injection materials according to the present invention are sufficiently hardened at 150° C. or less and the hardening time can be freely controlled in response to each case. In addition, the hardening time is gradually shortened with a rise of temperature. On the contrary, the conventional injection material has shown an exothermic reaction since it is hardened by an acid, and the hardening speed is rapidly increased with a rise of temperature. The hardening explosively proceeds at 100° C. to obtain a repaired body having a high porosity. Accordingly, there is no comparison between the injection material according to the present invention and the conventional injection material.

On the other hand, also the durability of the conventional injection material in the blast furnace is merely 1 to 2 weeks in dependence upon portions, as shown in Comparative Examples, but the injection material according to the present invention remains in 70 to 80% even after 4 weeks, that is to say, it exhibits a remarkably superior durability. Besides, according to the present invention, since the hardening speed can be controlled by changing the quantity of the hardening-accelerator to be added in response to temperatures of the portions, the injection material is uniformly remained all over the portions to be repaired. On the contrary, the injection repair material in Comparative Examples can not achieve such a control, so that the portions are different in durability. In addition, according to the present invention, no special mixing facility is required for injecting and the operation can be very efficiently achieved even in a small working area.

We claim:

1. An injection material for use in a blast furnace, consisting essentially of a refractory material, a thermosetting resin, an epoxy radical containing organic compound as a hardening agent and an alkaline compound as a hardening-accelerator.

2. An injection material for use in a blast furnace as set forth in claim 1, wherein the thermosetting resin is used in an amount of 5 to 70 parts by weight based on 100 parts by weight of the refractory material.

3. An injection material for use in a blast furnace as set forth in claim 1, wherein the epoxy radical-containing organic compound is used in an amount of 5 to 70 parts by weight based on 100 parts by weight of the thermosetting resin.

4. An injection material for use in a blast furnace as set forth in claim 1, wherein the alkaline compound is used in an amount of 6 to 50 parts by weight based on 100 parts by weight of the thermosetting resin.

5. An injection material for use in a blast furnace as set forth in claim 1, wherein the thermosetting resin is used in an amount of 5 to 70 parts by weight based on 100 parts by weight of the refractory material, the epoxy radical-containing organic compound is used in an amount of 5 to 70 parts by weight based on 100 parts by weight of the thermosetting resin, and the alkaline compound is used in an amount of 6 to 50 parts by weight based on 100 parts by weight of the thermosetting resin.

6. An injection material for use in a blast furnace as set forth in claim 5 in which the refractory material is selected from the group consisting of alumina, chamotte, bauxite, clay, graphite and petroleum coke, the thermosetting resin is a phenolic or furan resin, the epoxy radical-containing organic compound is selected from the group consisting of aliphatic epoxy compounds, alicyclic epoxy compounds, propylene oxide, and epichlorhydrine bisphenol A and the alkaline compound as the hardening-accelerator is selected from the group consisting of sodium carbonate, water glass, magnesium oxide, calcium oxide and ammonia.

* * * * *